US010023227B2

United States Patent
Kubo

(10) Patent No.: US 10,023,227 B2
(45) Date of Patent: Jul. 17, 2018

(54) STEERING ASSISTANCE CONTROL APPARATUS

(71) Applicant: SUBARU CORPORATION, Tokyo (JP)

(72) Inventor: Takashi Kubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/269,211

(22) Filed: Sep. 19, 2016

(65) Prior Publication Data

US 2017/0088169 A1    Mar. 30, 2017

(30) Foreign Application Priority Data

Sep. 25, 2015   (JP) .................. 2015-188773

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |

(Continued)

(52) U.S. Cl.
CPC .............. B62D 6/005 (2013.01); B60R 11/04 (2013.01); B60W 30/12 (2013.01)

(58) Field of Classification Search
None
See application file for complete search history.

(56) References Cited

U.S. PATENT DOCUMENTS

| 4,720,790 A * | 1/1988 | Miki | B62D 7/159 |
| | | | 180/415 |
| 5,809,438 A * | 9/1998 | Noro | B62D 5/046 |
| | | | 180/422 |

(Continued)

FOREIGN PATENT DOCUMENTS

| CN | 101965286 | 2/2011 | |
| EP | 1336548 A2 * | 8/2003 | ............... B62D 6/04 |

(Continued)

OTHER PUBLICATIONS

JP 5967336 B2 machine translation from JPO (2018).*

(Continued)

*Primary Examiner* — Jean Paul Cass
(74) *Attorney, Agent, or Firm* — McDermott Will & Emery LLP

(57) ABSTRACT

A steering assistance control apparatus includes a positional deviation calculator, a relative yaw angle calculator, a target value calculator, and a steering driver. The positional deviation calculator calculates a lateral positional deviation between an own vehicle and a preceding vehicle, based on a detection signal by a sensor. The relative yaw angle calculator calculates a relative yaw angle, in which the relative yaw angle is an angle formed by a traveling direction of the own vehicle and a traveling direction of the preceding vehicle. The target value calculator calculates a steering-related control target value, based on the lateral positional deviation and the relative yaw angle. The steering driver that drives a steering mechanism, based on the control target value.

18 Claims, 9 Drawing Sheets

(51) Int. Cl.
*G06F 7/00* (2006.01)
*G06F 17/00* (2006.01)
*G06F 19/00* (2018.01)
*B60R 11/04* (2006.01)
*B60W 30/12* (2006.01)

(56) References Cited

U.S. PATENT DOCUMENTS

| | | | | |
|---|---|---|---|---|
| 5,835,872 A * | 11/1998 | Matsuoka | ............ | B62D 5/0463 701/41 |
| 5,997,558 A * | 12/1999 | Nash | ............ | A61B 17/22 606/159 |
| 6,032,756 A * | 3/2000 | Nishimura | ............ | B62D 5/0463 180/443 |
| 6,411,052 B1 * | 6/2002 | Mir | ............ | H02P 6/10 318/434 |
| 6,445,151 B1 * | 9/2002 | Nakano | ............ | B62D 5/0493 180/165 |
| 6,498,451 B1 * | 12/2002 | Boules | ............ | B62D 5/0403 318/400.06 |
| 6,597,975 B1 * | 7/2003 | Shinmura | ............ | B62D 5/0472 318/430 |
| 6,671,597 B2 * | 12/2003 | Kada | ............ | B62D 5/0463 180/443 |
| 6,694,287 B2 * | 2/2004 | Mir | ............ | H02P 6/08 318/565 |
| 6,751,538 B2 * | 6/2004 | Endo | ............ | B62D 5/0463 180/446 |
| 7,725,227 B2 * | 5/2010 | Pattok | ............ | B62D 6/04 180/443 |
| 8,204,647 B2 * | 6/2012 | Nakane | ............ | B62D 5/0484 180/402 |
| 8,285,451 B2 * | 10/2012 | Ta | ............ | B62D 5/046 180/446 |
| 8,521,367 B2 * | 8/2013 | Mulder | ............ | B60W 30/12 701/42 |
| 8,660,754 B2 * | 2/2014 | Kristensen | ............ | B63H 25/02 180/446 |
| 8,786,244 B2 * | 7/2014 | Jang | ............ | H02P 23/14 318/473 |
| 8,825,301 B2 * | 9/2014 | Sugawara | ............ | B62D 5/0466 180/412 |
| 8,842,455 B2 * | 9/2014 | Kimpara | ............ | H02M 3/156 323/286 |
| 9,522,696 B2 * | 12/2016 | Hong | ............ | B62D 5/0484 |
| 2002/0125063 A1 * | 9/2002 | Kurishige | ............ | B62D 5/0466 180/443 |
| 2005/0150712 A1 * | 7/2005 | Tokumoto | ............ | B62D 5/0484 180/443 |
| 2006/0222526 A1 * | 10/2006 | Seiford, Sr. | ............ | B63H 1/16 417/405 |
| 2007/0090782 A1 * | 4/2007 | Endo | ............ | B62D 5/046 318/432 |
| 2007/0159224 A1 * | 7/2007 | Dwarka | ............ | H03K 5/1565 327/175 |
| 2008/0040001 A1 * | 2/2008 | Ogawa | ............ | B62D 5/008 701/41 |
| 2011/0015850 A1 | 1/2011 | Tange et al. | | |
| 2014/0222295 A1 * | 8/2014 | Dornhege | ............ | B62D 6/002 701/42 |
| 2017/0088169 A1 * | 3/2017 | Kubo | ............ | B60R 11/04 |
| 2017/0174258 A1 * | 6/2017 | Yamada | ............ | B62D 6/002 |

FOREIGN PATENT DOCUMENTS

| | | |
|---|---|---|
| JP | 2000-020896 A | 1/2000 |
| JP | 2000-322697 A | 11/2000 |
| JP | 2003-81123 A | 3/2003 |
| JP | 2006-298059 A | 11/2006 |
| JP | 2010-105498 A | 5/2010 |
| JP | 5967336 B2 * | 4/2015 |
| JP | 2015-116918 A | 6/2015 |

OTHER PUBLICATIONS

Notification of Reasons for Refusal dated Nov. 15, 2016, issued in Japanese Patent Application No. 2015-188773. (w/ English translation).
Decision of Grant dated Apr. 18, 2017, issued in Japanese Patent Application No. 2015-188773. (w/ English translation).
Japanese Offiuce Action dated Nov. 15, 2016, issued in Japanese Patent Application No. 2015-188773. (w/ English translation).
First Office Action issued in Chinese Patent Application No. 201610832142.3, dated Jan. 19, 2018 (With English Translation).

* cited by examiner

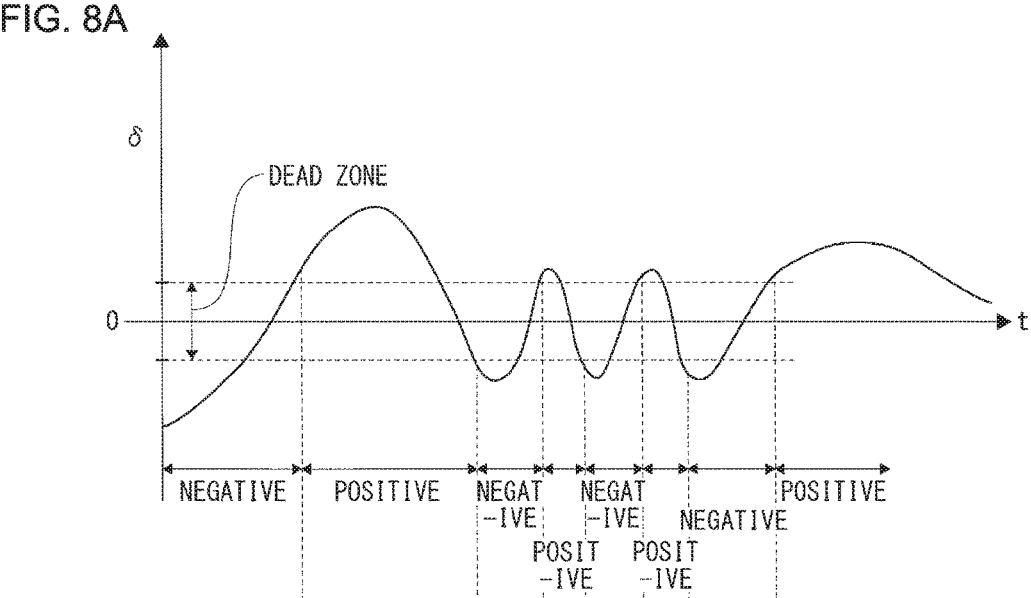
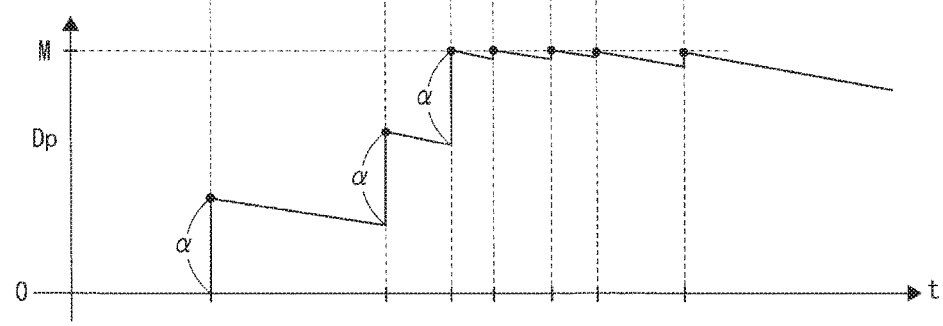

STEERING ASSISTANCE CONTROL APPARATUS

CROSS-REFERENCE TO RELATED APPLICATIONS

The present application claims priority from Japanese Patent Application No. 2015-188773 filed on Sep. 25, 2015, the entire contents of which are hereby incorporated by reference.

BACKGROUND

The technology relates to a steering assistance control apparatus that may be mounted on a vehicle.

A follow-up steering control function has been known as one example of steering assistance functions. The follow-up steering control function may allow a lateral position of an own vehicle to follow a predetermined follow-up target. Non-limiting examples of the follow-up target may include middle of a traveling lane and a preceding vehicle.

The follow-up steering control may involve: detecting a position of the steering follow-up target such as the preceding vehicle, by a sensor or inter-vehicular communication; calculating a lateral positional deviation between the position of the target and the own vehicle; calculating a steering-related control target value, based on the positional deviation; and driving a steering mechanism, based on the control target value. Non-limiting examples of the sensor may include a camera that captures an image ahead of the own vehicle.

The follow-up steering control may lead to possibility that, when the preceding vehicle meanders, the own vehicle follows the meandering of the preceding vehicle. Such meandering of the own vehicle may cause a driver to feel incongruous.

To address this inconvenience, for example, Japanese Unexamined Patent Application Publication (JP-A) No. 2000-20896 discloses a technique that focuses on temporal variation in the lateral positional deviation between the own vehicle and the preceding vehicle, in particular, cycles of the variation. The technique proposes adjustment of a control gain in accordance with the cycles, to restrain the follow-up to the meandering of the preceding vehicle.

SUMMARY

Obtaining the cycles of the variation in the lateral positional deviation as in JP-A No. 2000-20896, however, may involve accumulation of values of the lateral positional deviation for a certain duration of time. This may take some time before the control gain is adjusted. In other words, after the preceding vehicle starts meandering, it may take some time to start restraining the follow-up to the meandering of the preceding vehicle. This may result in lack of immediate effectiveness of the control.

It is desirable to provide a steering assistance control apparatus that makes it possible to alleviate a driver's sense of incongruity due to meandering of an own vehicle that accompanies follow-up steering control, and to ensure immediate effectiveness of control.

An aspect of the technology provides a steering assistance control apparatus that includes a positional deviation calculator, a relative yaw angle calculator, a target value calculator, and a steering driver. The positional deviation calculator calculates a lateral positional deviation between an own vehicle and a preceding vehicle, based on a detection signal by a sensor. The relative yaw angle calculator calculates a relative yaw angle, in which the relative yaw angle is an angle formed by a traveling direction of the own vehicle and a traveling direction of the preceding vehicle. The target value calculator calculates a steering-related control target value, based on the lateral positional deviation and the relative yaw angle. The steering driver drives a steering mechanism, based on the control target value.

A polarity inversion of the relative yaw angle may cause the target value calculator to calculate the control target value, to allow a control amount of steering to be smaller.

The target value calculator may calculate the control target value, to allow the control amount to be smaller in accordance with magnitude of an absolute value of the relative yaw angle.

The target value calculator may calculate the control target value, to allow the control amount to be smaller, as the polarity inversion of the relative yaw angle occurs on shorter cycles.

The target value calculator may calculate the control target value, to alleviate a degree in which the control amount becomes smaller, in accordance with a duration of time during which a polarity of the relative yaw angle is kept unchanged after the polarity inversion.

The target value calculator may perform polarity determination of the relative yaw angle which utilizes a dead zone.

BRIEF DESCRIPTION OF THE DRAWINGS

FIGS. 8A and 8B schematically illustrate an example of transition of the relative yaw angle (FIG. 8A) during execution of a follow-up steering control, and transition of the damping coefficient (FIG. 8B) calculated by the process illustrated in FIG. 7, in correspondence with the example of transition.

DETAILED DESCRIPTION

1. Configuration of Steering Assistance Control Apparatus

In the following, some implementations of the technology are described with reference to the accompanied drawings.

Figure 1:
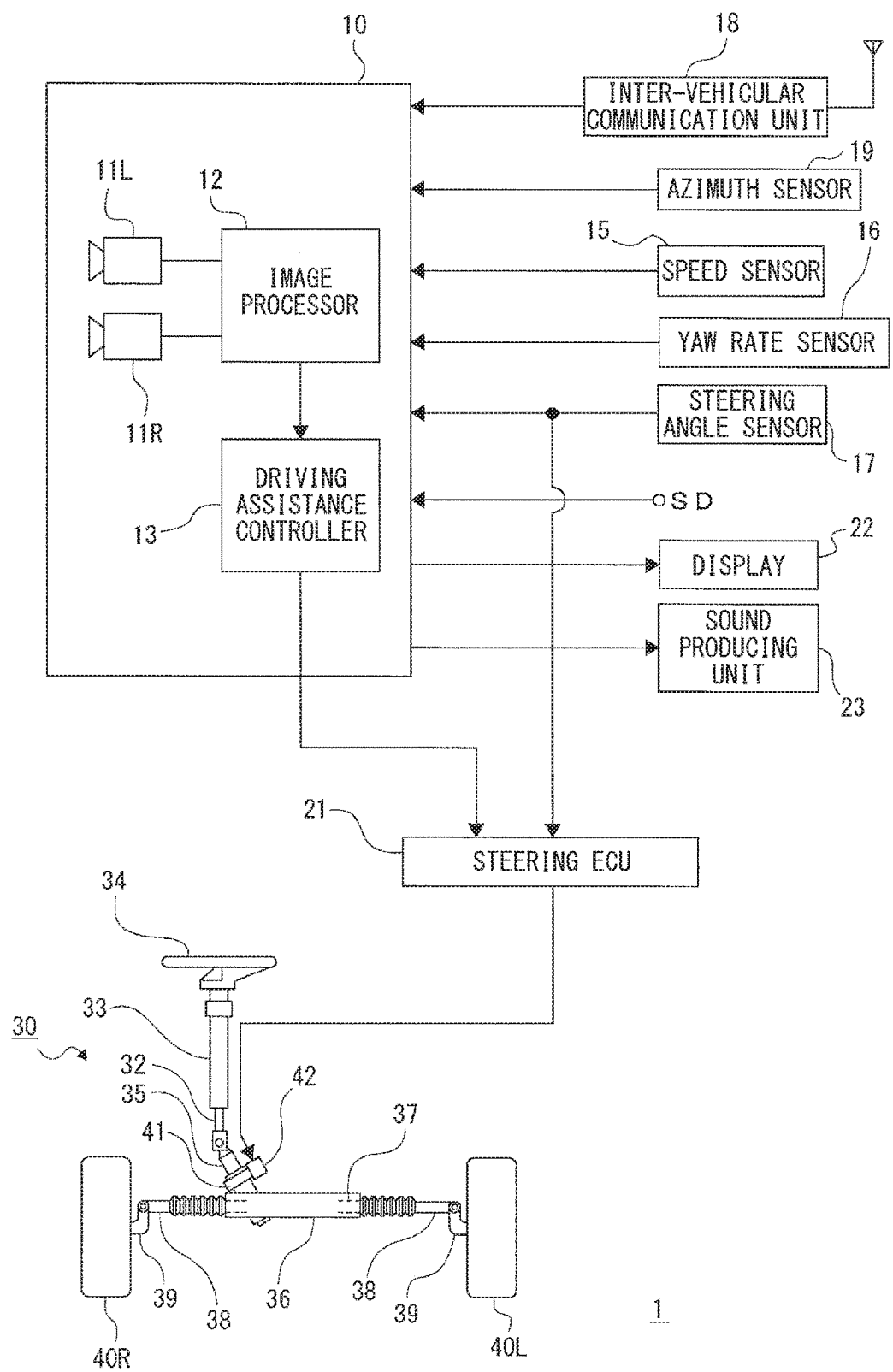
FIG. 1 is a block diagram of a key part of a vehicle-mounted system including a steering assistance control apparatus according to an implementation of the technology.

FIG. 1 illustrates a key part of a vehicle-mounted system 1 including a steering assistance control apparatus according to an implementation of the technology. The steering assistance control apparatus according to the implementation may include an image-capturing unit 10 and a steering electronic control unit (ECU) 21. FIG. 1 depicts a steering mechanism 30 as a target of a steering assistance control performed by the steering assistance control apparatus. FIG. 1 also depicts sensors used for the steering assistance control. Non-limiting examples of the sensors may include a speed sensor 15, a yaw rate sensor 16, and a steering angle sensor 17. FIG. 1 further depicts parts related to the steering assistance control, such as a display 22 and a sound producing unit 23. Moreover, FIG. 1 depicts an inter-vehicular communication unit 18 and an azimuth sensor 19. The inter-vehicular communication unit 18 is designed to perform inter-vehicular communication between an own vehicle and another vehicle or other vehicles. The azimuth sensor 19 may detect an azimuth, or a direction, in which the own vehicle is traveling.

The image-capturing unit 10 may include an image-capturing device 11R, an image-capturing device 11L, an image processor 12, and a driving assistance controller 13. The image-capturing devices 11R and 11L may be so located as to capture an image in a traveling direction of the own vehicle, i.e., ahead of the own vehicle.

The speed sensor 15, the yaw rate sensor 16, and the steering angle sensor 17 may be coupled to the image-capturing unit 10. The speed sensor 15 may detect a speed of the own vehicle, as an own-vehicle speed v. The yaw rate sensor 16 may detect a yaw rate. The steering angle sensor 17 may detect a steering angle. The image processor 12 and the driving assistance controller 13 may receive detection signals obtained by these sensors.

The image-capturing devices 11R and 11L may be disposed, for example but not limited to, in vicinity of an upper part of a windshield of the own vehicle. The image-capturing devices 11R and 11L may be spaced a predetermined distance away from each other in a vehicle-widthwise direction, so as to allow for distance measurement by a so-called stereo method. Optical axes of the image-capturing devices 11R and 11L may be parallel, and their focal distances may be a same value. Their frame periods may be synchronized, and their frame rates may coincide. The image-capturing devices 11R and 11L each may include an imaging element. The number of pixels of the imaging element may be, for example but not limited to, horizontally about 1280 pixels by vertically about 960 pixels.

The imaging elements of the respective image-capturing devices 11R and 11L may obtain electrical signals, or captured image signals. The captured image signals may be analog/digital (A/D) converted into digital image signals, or captured image data. The captured image data may indicate a luminance value based on predetermined gradations, for each pixel. The captured image data may be, for example but not limited to, color image data. Accordingly, three pieces of data, or three luminance values, in R (red), G (green), and B (blue) may be obtained for one pixel. The gradations of the luminance values may be, for example but not limited to, 256 gradations.

The image processor 12 may include a microcomputer. The microcomputer may include, for example but not limited to, a central processing unit (CPU), read only memory (ROM), and random access memory (RAM) that may serve as a work area. The image processor 12 may execute various processes in accordance with programs stored in the ROM.

The image processor 12 may store, in internal memory, the captured image data for each frame. The captured image data for each frame may be obtained by the image-capturing devices 11R and 11L, by capturing the image ahead of the own vehicle. The image processor 12 may execute various processes, based on two pieces of the captured image data for each frame. The various processes may involve recognizing objects present ahead of the own vehicle as external environment. Specifically, the image processor 12 may recognize, for example but not limited to, a lane line formed on a road, and a three-dimensional object such as the preceding vehicle and obstacles. The lane line may be a line that divides a traveling lane. The lane line may be a white line, an orange line, or any other colored line. Also, the image processor 12 may estimate a traveling path of the own vehicle, or an own-vehicle traveling path, based on information on the lane line thus detected.

In recognizing the three-dimensional object ahead of the own vehicle, the image processor 12 may perform a process on the pair of pieces of the captured image data, or stereo images, obtained by the image-capturing devices 11R and 11L. The process may involve obtaining distance information, by a principle of triangulation, based on an amount of deviation between a position in one of the stereo images and a corresponding position in another of the stereo images. The image processor 12 may generate, based on the distance information, data that represents three-dimensional distance distribution, i.e., a distance image. Thereafter, based on the data thus generated, the image processor 12 may perform a known process of grouping, or compare the data thus generated, with data stored in advance. Non-limiting examples of the data stored in advance may include data on three-dimensional road shape and data on three-dimensional objects. Based on the comparison, the image processor 12 may extract data on the lane line, data on a side wall such as a guardrail and a curbstone that are present along a road, and data on a three-dimensional object such as a vehicle.

The data on the three-dimensional object thus obtained may include a distance from the own vehicle to the three-dimensional object, and a temporal change in the distance, i.e., a relative speed to the own vehicle. From the data on the three-dimensional object thus obtained, a vehicle may be extracted in particular, as the preceding vehicle, that is closest to the own vehicle on the own-vehicle traveling path, and is traveling in a substantially same direction as the own vehicle, at a predetermined speed. The predetermined speed may be zero (0) kilometer/hour or more, without limitation. Note that, among the preceding vehicles, a vehicle having a speed of substantially zero (0) kilometer/hour may be recognized as a stopped preceding vehicle.

Moreover, positional information of a left end point and a right end point of a rear surface of the three-dimensional object or the preceding vehicle may be stored as information on the three-dimensional object or information on the preceding vehicle. Substantial middle of the left end point and the right end point of the rear surface may be further stored as a center position of the three-dimensional object or the preceding vehicle.

Figure 2:
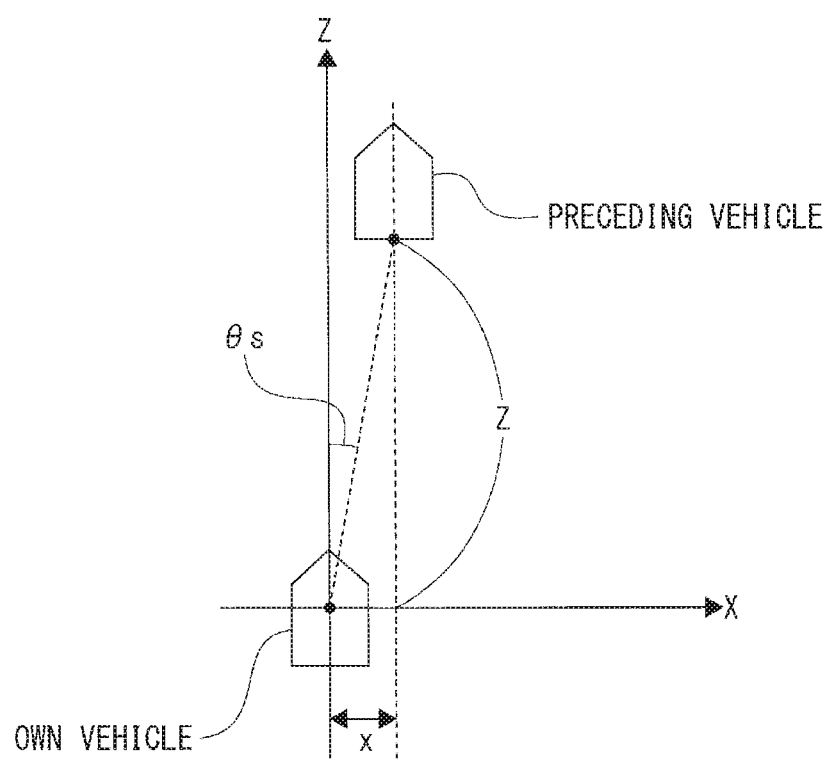
FIG. 2 illustrates a lateral positional deviation between an own vehicle and a preceding vehicle.

Furthermore, information on a preceding-vehicle position, a preceding-vehicle distance, a preceding-vehicle speed, and preceding-vehicle acceleration may be also calculated and stored as the information on the preceding vehicle. The preceding-vehicle position may be represented as a coordinate position on an X-Z coordinate system as illustrated in FIG. 2, in which a Z axis denotes an own-vehicle front-rear direction, and an X axis denotes an own-vehicle left-right direction, or a lateral direction. The preceding-vehicle distance may be an inter-vehicular distance from the own vehicle. Hereinafter, the preceding-vehicle distance may be referred to as the inter-vehicular distance z. The preceding-vehicle speed may be given as addition of an amount of change in the inter-vehicular distance z to the own-vehicle speed v ((the amount of change in the inter-vehicular distance z)+(the own-vehicle speed v)). The preceding-vehicle acceleration may be a differential value of the preceding-vehicle speed.

Note that a position of the three-dimensional object other than the preceding vehicle, a position of the lane line, and a position of the own-vehicle traveling path may be also calculated and stored as coordinate positions on the X-Z coordinate system as described.

Thus, the image processor 12 may perform the image recognition of the preceding vehicle, the three-dimensional object, the lane line, and other objects. Results of the image recognition may be used for a driving assistance control of various kinds.

Regarding the steering assistance control according to this implementation, the driving assistance controller 13 may receive information including the information on the lane line detected, and the information on the preceding vehicle. The information on the lane line may include information on the own-vehicle traveling path.

In this implementation, the inter-vehicular communication unit 18 and the azimuth sensor 19 may be coupled to the image-capturing unit 10. This makes it possible for the driving assistance controller 13 to receive information received by the inter-vehicular communication unit 18 from another vehicle or other vehicles, in particular, from the preceding vehicle, and to receive information detected by the azimuth sensor 19 on a traveling azimuth of the own vehicle.

The driving assistance controller 13 may perform a control for driving assistance of various kinds, based on input information that represents the results of the image recognition by the image processor 12.

In one specific but non-limiting implementation, the driving assistance controller 13 may perform a steering assistance control, or a steering control, such as a lane keeping control and a lane deviation prevention control, by setting the steering angle independently from a driver. The lane keeping control may involve keeping the own vehicle in middle of the own-vehicle traveling path. The lane deviation prevention control may involve preventing the own vehicle from deviating from the own-vehicle traveling path, or preventing the own vehicle from the lane of the own-vehicle traveling path.

In this implementation, the driving assistance controller 13 may also perform a follow-up steering control, as the steering-related driving assistance control. The follow-up steering control may involve allowing a lateral position of the own vehicle to follow the preceding vehicle.

In this implementation, in executing the follow-up steering control, the driving assistance controller 13 may calculate a relative yaw angle δ. The relative yaw angle δ may be an angle formed by the traveling direction of the own vehicle and a traveling direction of the preceding vehicle, as described later.

The driving assistance controller 13 may determine an operation condition of the steering control of various kinds, and execute the steering control when the operation condition is satisfied. The determination as to whether or not the steering control is ready to operate may be made based on operation information SD of the driver, the information from the image processor 12, the information from the sensors, and other pieces of information. Note that the operation information SD of the driver may comprehensively represent operation information on, for example but not limited to, an on/off operation of an adaptive cruise control (ACC) switch and a steering control execution switch.

In performing the steering control, the driving assistance controller 13 may calculate, based on the input information as described, a steering instruction current value as a target, and output the calculated steering instruction current value to the steering ECU 21.

In particular, in performing the follow-up steering control as described, the driving assistance controller 13 may calculate a target steering angle $\theta_{TG}$, and obtain the steering instruction current value in accordance with the target steering angle $\theta_{TG}$.

To calculate the target steering angle $\theta_{TG}$, the driving assistance controller 13 may first obtain a target base steering angle $\theta_H$ by the following [Expression 1].

$$\theta_H = G(v) \times x/z \quad \text{[Expression 1]}$$

where x denotes a lateral positional deviation between the own vehicle and the preceding vehicle (refer to FIG. 2), z denotes the preceding-vehicle distance, i.e., the inter-vehicular distance z, as described, and G(v) denotes a steering angle correction gain in accordance with the own-vehicle speed v. Hereinafter, the lateral positional deviation may be also simply referred to as a "lateral deviation". A term "x/z" may be a term that represents, in a simplified manner, an angle $\theta_S$ illustrated in FIG. 2, i.e., a yaw angle involved in a follow-up to the preceding vehicle, based on trigonometric functions. The steering angle correction gain G(v) may be a function in accordance with the own-vehicle speed v in consideration that relation between the yaw rate and the steering angle may change depending on the own-vehicle speed v.

Note that the lateral deviation x may be calculated by the image processor 12, as the information on the preceding vehicle, i.e., the information on the preceding-vehicle position as described, and supplied to the driving assistance controller 13, when a position of the own vehicle serves as an origin position of the X-Z coordinate system, as illustrated in FIG. 2.

Furthermore, based on the target base steering angle $\theta_H$ as described, the driving assistance controller 13 may obtain the final target steering angle $\theta_{TG}$ by the following [Expression 2].

$$\theta_{TG} = \theta_H + G_D \times \delta \quad \text{[Expression 2]}$$

where $G_D$ denotes a correction gain.

By the [Expression 2], the driving assistance controller 13 may correct the target base steering angle $\theta_H$, based on the relative yaw angle δ, to thereby obtain the final target steering angle $\theta_{TG}$.

Here, the correction gain $G_D$ may serve as a coefficient that may adjust an amount of correction in correcting, based on the relative yaw angle δ, the target base steering angle $\theta_H$. In this implementation, however, the correction gain $G_D$ may be variable based on a value of the relative yaw angle δ, as described later in detail.

As described, a base target value such as the target base steering angle $\theta_H$ may be calculated in obtaining the final control target value in the follow-up steering control. The base target value may be, in other words, a base target value that may serve as a target of correction based on the relative yaw angle δ. Note that a calculation method of the base target value is not limited to an example as described above. The base target value may be calculated by other methods.

The base target value in the follow-up steering control may be any value calculated based on the lateral positional deviation between the own vehicle and the preceding vehicle, e.g., the lateral positional deviation x as described.

The steering ECU 21 may include a microcomputer, and control an electric motor 42 of the steering mechanism 30, based on the steering instruction current value and the detection signal derived by the steering angle sensor 17. The steering instruction current value may be obtained from the target steering angle $\theta_{TG}$ by the driving assistance controller 13.

The steering ECU 21 may obtain, based on information on the steering angle obtained from the detection signal of the steering angle sensor 17, the steering instruction current value that allows assistance torque of steering in accordance with the steering angle to be obtained. The steering ECU 21 may drive the electric motor 42, based on the steering instruction current value thus obtained. This leads to achievement of a power steering control that assists steering by the driver.

Note that the driver may perform a steering operation during the execution of the steering control by the driving assistance controller 13. When such manual steering is performed during the execution of the steering control, the steering ECU 21 may perform addition of the steering instruction current value from the driving assistance controller 13 and the steering instruction current value for the power steering control obtained as described above. The steering ECU 21 may drive the electric motor 42, based on a current value obtained by the addition.

The steering mechanism 30 may serve as the target of the steering control, and may be configured, for example, as follows.

Referring to FIG. 1, the steering mechanism 30 may include a steering shaft 32 and a steering column 33. The steering shaft 32 may be turnably supported, through the steering column 33, by an undepicted vehicle frame. A first end of the steering shaft 32 may be extended toward a driver's seat. A steering wheel 34 may be attached to the first end of the steering shaft 32. A second end of the steering shaft 32 may be extended toward an engine room. A pinion shaft 35 may be linked to the second end of the steering shaft 32.

A steering gear box 36 may be disposed in the engine room. The steering gear box 36 may be extended in the vehicle-widthwise direction. A rack shaft 37 may be reciprocatably inserted through and supported by the steering gear box 36. An undepicted rack may be provided in middle of the rack shaft 37. The pinion shaft 35 may be provided with an undepicted pinion. Engagement of the pinion with the rack may constitute a rack-and-pinion steering gear mechanism.

Both right and left ends of the rack shaft 37 may be protruded from the steering gear box 36. A front steering knuckle 39 may be connected to each of the right and left ends of the rack shaft 37 through a tie rod 38. The front steering knuckles 39 may turnably support right and left wheels 40R and 40L that may serve as steered wheels, and may be supported by and interlocked with the vehicle frame through undepicted kingpins. An operation of the steering wheel 34 may cause the steering shaft 32 and the pinion shaft 35 to be turned. The turning of the pinion shaft 35 may cause movement of the rack shaft 37 leftward or rightward. The movement may cause the front steering knuckles 39 to turn around the undepicted kingpins, allowing the right and left wheels 40R and 40L to be steered leftward or rightward.

The electric motor 42 may be linked to the pinion shaft 35 through an assistance transmission mechanism 41. The electric motor 42 may provide assistance with the steering torque applied to the steering wheel 34, and apply the steering torque to the steering wheel 34 to allow for the target steering angle $\theta_{TG}$.

In this implementation, the driving assistance controller 13 may perform various kinds of notification regarding the driving assistance, as well as assistance of the driver by the application of the steering torque as described. In one specific but non-limiting implementation, the driving assistance controller 13 may supply the display 22 with display information, and supply the sound producing unit 23 with sound production instruction information.

The display 22 may comprehensively refer to a display control unit and a display device. The display control unit may include, for example but not limited to, a microcomputer. The display device may include, for example but not limited to, various meters such as a speed meter and a tachometer, and a multi-function display (MFD), and other devices that provides the driver with information. The meters and the MFD may be provided in a dashboard disposed in front of the driver. The display 22 may provide, regarding the steering assistance, alarm display and display that allows the driver to sense that the steering control is on operation or stopped.

The sound producing unit 23 may comprehensively refer to a sound production control unit and a sound producing device such as an amplifier and a speaker. The sound production control unit may include, for example but not limited to, a microcomputer. The sound producing unit 23 may provide, regarding the steering, an output of an alarm sound and an output of a notification sound that allows the driver to sense that the steering control is on operation or stopped.

2. Calculation of Relative Yaw Angle

Figure 3:
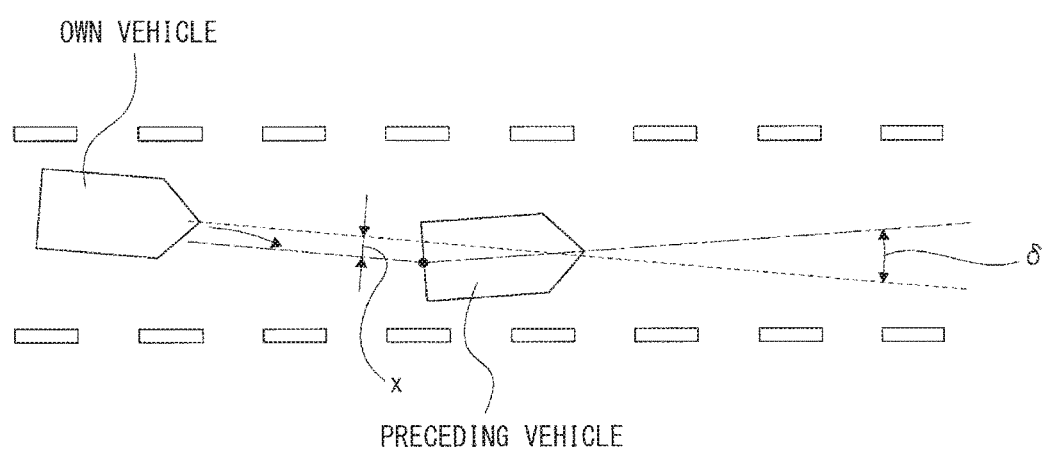
FIG. 3 schematically illustrates the lateral positional deviation and a relative yaw angle between the own vehicle and the preceding vehicle.

FIG. 3 schematically illustrates the lateral positional deviation x and the relative yaw angle δ between the own vehicle and the preceding vehicle. Note that a broken line (a simple broken line) in the figure denotes the traveling direction of the own vehicle, whereas a dashed line denotes the traveling direction of the preceding vehicle.

As exemplified in FIG. 3, in a case in which the preceding vehicle is deviated rightward with respect to the own vehicle, the own vehicle may be turned rightward (refer to a solid-lined arrow in the figure), when the follow-up steering control is performed with the target base steering angle $\theta_H$ obtained by the forgoing [Expression 1] used directly as the control target value.

At this occasion, however, there may be possibly a case in which the traveling direction of the preceding vehicle may be directed leftward with respect to the traveling direction of the own vehicle, as illustrated in the figure. In such a case, the own vehicle turns rightward, while the preceding vehicle turns leftward. Accordingly, the follow-up currently performed by the own vehicle may become useless.

Such behavior of the own vehicle accompanying the follow-up steering control may also occur when the preceding vehicle makes transition thereafter from the leftward-turning state to a rightward-turning state. This results in a situation that the own vehicle may uselessly follow meandering of the preceding vehicle.

To address this inconvenience, the implementation may focus on the relative yaw angle δ between the own vehicle and the preceding vehicle, and limit an amount of control of the follow-up steering control, based on the relative yaw angle δ, to restrain the useless follow-up to the preceding vehicle (refer to [Expression 2] as described).

Here, the relative yaw angle δ may be obtained by, for example but not limited to, any of the following methods.

(1) a method that may involve obtaining an angle of a traveling azimuth of the preceding vehicle by the inter-vehicular communication, and calculating, as the relative yaw angle δ, a deviation between the angle of the traveling azimuth and an angle of the traveling azimuth of the own vehicle.

(2) a method that may involve obtaining a yaw angle of the preceding vehicle to the lane line (hereinafter referred to as a "preceding-vehicle-to-lane-line yaw angle ψ") by the inter-vehicular communication, and calculating the relative yaw angle δ, based on the preceding-vehicle-to-lane-line yaw angle ψ and a yaw angle of the own vehicle to the lane line (hereinafter referred to as an "own-vehicle-to-lane-line yaw angle φ").

(3) a method that may involve estimating the relative yaw angle δ, based on a non-linear Kalman filter.

First, a description is given on a case with the forgoing method (1) adopted. The driving assistance controller 13 may obtain information on the angle of the traveling azimuth of the preceding vehicle, and obtain information on the angle of the traveling azimuth of the own vehicle. The angle of the traveling azimuth of the preceding vehicle may be detected by the azimuth sensor 19 of the preceding vehicle. The information on the angle of the traveling azimuth of the preceding vehicle may be received by the inter-vehicular communication unit 18. The angle of the traveling azimuth of the own vehicle may be detected by the azimuth sensor 19 of the own vehicle. Thereafter, the driving assistance controller 13 may calculate a difference between the angles of the traveling azimuths, as the relative yaw angle δ.

Figure 4A:
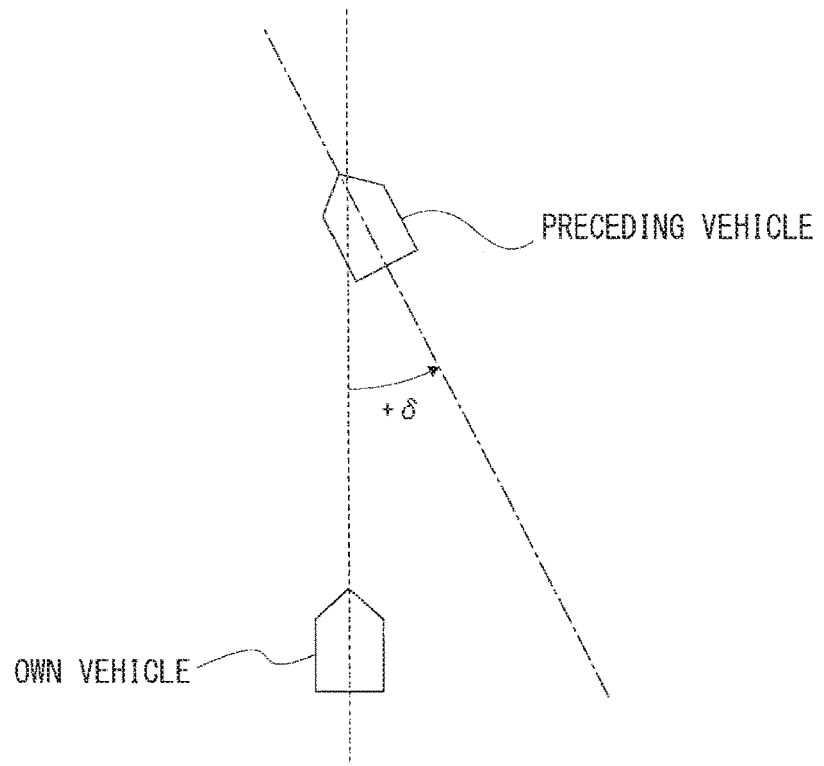
FIGS. 4A and 4B illustrate polarity of the relative yaw angle.
Figure 4B:
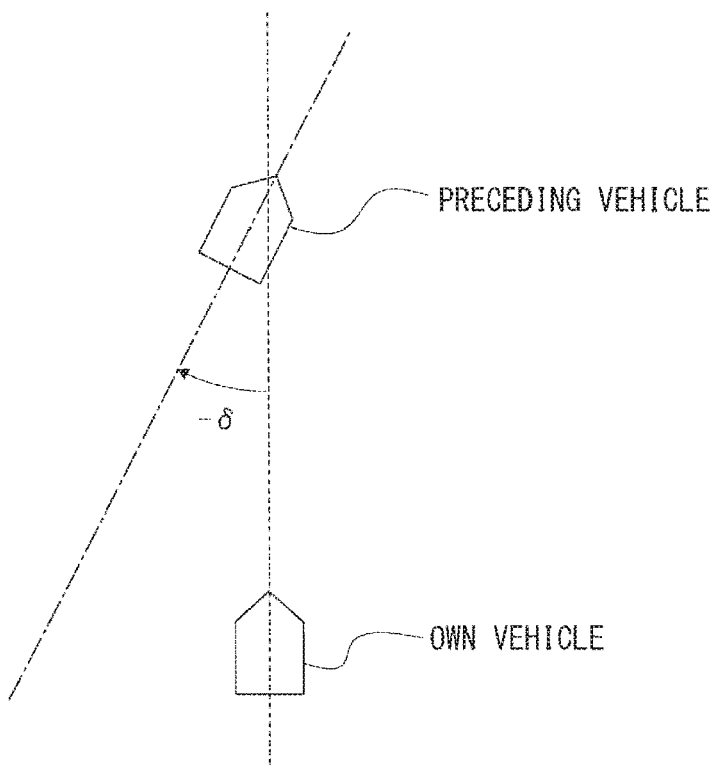

In this example, referring to FIG. 4A and FIG. 4B, the driving assistance controller 13 may calculate the relative yaw angle δ as an angle having polarity with respect to the traveling direction of the own vehicle serving as a reference. In one specific but non-limiting example, the driving assistance controller 13 may calculate the relative yaw angle δ, to allow the polarity of the relative yaw angle δ to be "positive" when the traveling direction of the preceding vehicle is inclined leftward with respect to the traveling direction of the own vehicle as illustrated in FIG. 4A, and to allow the polarity of the relative yaw angle δ to be "negative" when the traveling direction of the preceding vehicle is inclined rightward with respect to the traveling direction of the own vehicle as illustrated in FIG. 4B.

In one specific but non-limiting example, assume that the angle of the traveling azimuth detected by the azimuth sensor 19 may be zero (0) degree, i.e., 360 degrees at the north, and a value of the angle may increase, with the north serving as a reference, in the following order: the north, the east, the south, the west, and the north. In this case, the driving assistance controller 13 may calculate the relative yaw angle δ having the polarity as exemplified in FIG. 4A and FIG. 4B, by subtracting the angle of the traveling azimuth of the preceding vehicle from the angle of the traveling azimuth of the own vehicle, i.e., calculating ((the angle of the traveling azimuth of the own vehicle)−(the angle of the traveling azimuth of the preceding vehicle)).

Figure 5:
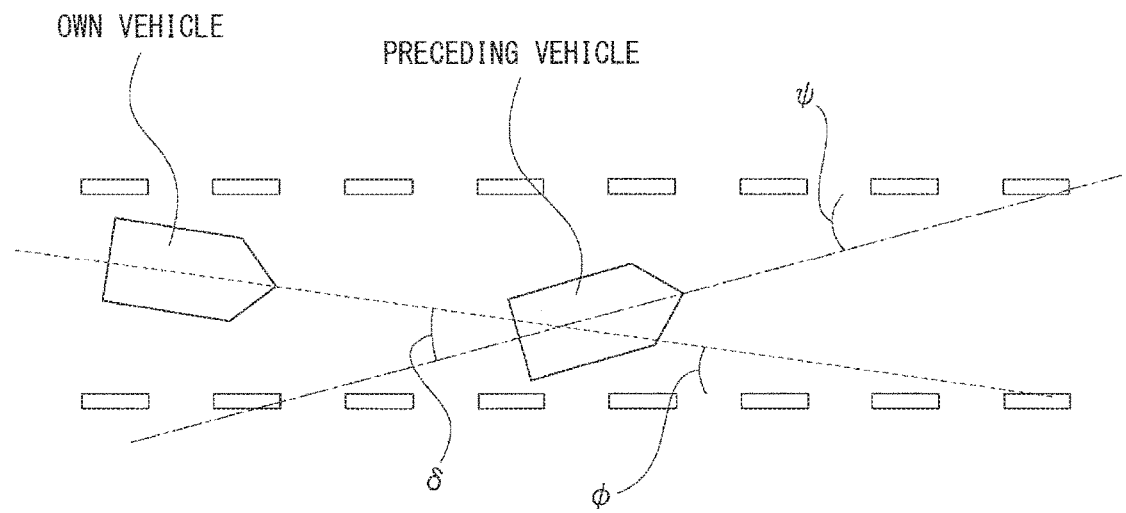
FIG. 5 illustrates a technique of obtaining the relative yaw angle, based on a yaw angle of the own vehicle to a lane line and a yaw angle of the preceding vehicle to a lane line.

A description is given next on a case with the forgoing method (2) adopted. In this case, the driving assistance controller 13 may calculate the preceding-vehicle-to-lane-line yaw angle ψ and the own-vehicle-to-lane-line yaw angle φ, based on the information on the lane line of the own-vehicle traveling path obtained by the image processor 12. In one specific but non-limiting example, the driving assistance controller 13 may calculate each of the preceding-vehicle-to-lane-line yaw angle ψ and the own-vehicle-to-lane-line yaw angle φ, as illustrated in FIG. 5, as an angle formed by the travelling direction of the preceding vehicle or the own vehicle and a direction of one of the lane lines that define the own-vehicle traveling path. The one of the lane lines that define the own-vehicle traveling path may be the lane line that crosses an extended line of the traveling direction of the preceding vehicle or the own vehicle, ahead of the own vehicle.

As appreciated with reference to FIG. 5, the following is established.

$$\delta=180-\{180-(\psi+\varphi)\}$$

The relative yaw angle δ may be, therefore, calculated by the following.

$$\delta=\psi+\varphi$$

Here, as appreciated with reference to FIG. 5, when the driving assistance controller 13 calculates the preceding-vehicle-to-lane-line yaw angle ψ with respect to the left lane line of the two lane lines, i.e., when the preceding vehicle turns leftward with respect to a direction in which the traveling path of the preceding vehicle extends, the polarity of the relative yaw angle δ is supposed to be "positive" as illustrated in FIG. 4A. In contrast, when the driving assistance controller 13 calculates the preceding-vehicle-to-lane-line yaw angle ψ with respect to the right lane line of the two lane lines, i.e., when the preceding vehicle turns rightward with respect to the direction in which the traveling path of the preceding vehicle extends, the polarity of the relative yaw angle δ is supposed to be "negative" as illustrated in FIG. 4B.

This implementation may, therefore, involve transmitting, to the own-vehicle side, information on yaw-angle polarity identification, in addition to the preceding-vehicle-to-lane-line yaw angle ψ. The information on the yaw-angle polarity identification may be information on identification as to whether the preceding-vehicle-to-lane-line yaw angle ψ has been calculated with respect to the right lane line or the left lane line.

Based on the information on the yaw-angle polarity identification, the driving assistance controller 13 of the own vehicle may set the polarity of the relative yaw angle δ calculated by the addition (ψ+φ) of the preceding-vehicle-to-lane-line yaw angle ψ and the own-vehicle-to-lane-line yaw angle φ.

A description is now given on a case with the forgoing method (3) adopted.

Figure 6:
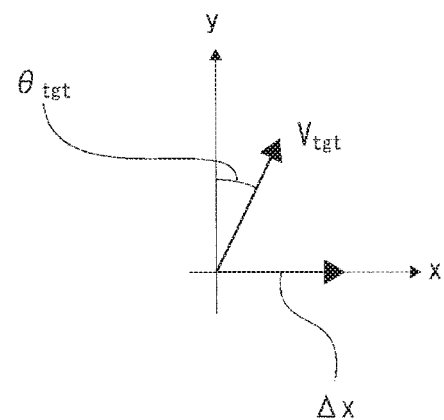
FIG. 6 illustrates behavior of the preceding vehicle with respect to a position of the own vehicle that serves as a reference, with a vector of a speed of the preceding vehicle and a vector of a speed of the lateral positional deviation.

The method (3) may presuppose dynamical relation as illustrated in FIG. 6. FIG. 6 represents behavior of the preceding vehicle with respect to the position of the own vehicle serving as a reference, with a vector of the preceding-vehicle speed Vtgt and a vector of a lateral positional deviation speed Δx, in an x-y coordinate system in which an x axis denotes the left-right direction of the own vehicle, and a y axis denotes the traveling direction of the own vehicle, with the position of the own vehicle serving as an origin. The preceding-vehicle speed Vtgt may be calculated as the information on the preceding vehicle as described, by the addition of the amount of change of the inter-vehicular distance z and the own-vehicle speed v ((the amount of change of the inter-vehicular distance z)+(the own-vehicle speed v)). The lateral positional deviation speed Δx may be a differential value of the lateral positional deviation x.

Then, an angle formed by the vector of the preceding-vehicle speed Vtgt and the y axis may be equivalent to the relative yaw angle δ. Note that, in the description of the method (3), the relative yaw angle δ may be expressed as a "relative yaw angle θtgt" for convenience.

With the relation illustrated in FIG. 6 presupposed, a state equation, i.e., a non-linear equation, may be given by the following [Expression 3], in a case in which driving power equals to zero (0) and a yaw moment equals to zero (0).

$$\frac{d}{dt}\begin{bmatrix} \Delta x \\ V_{tgt} \\ \theta_{tgt} \\ \alpha_{tgt} \\ \omega_{tgt} \end{bmatrix} = \begin{bmatrix} V_{tgt}\theta_{tgt} \\ \alpha_{tgt} \\ \omega_{tgt} \\ 0 \\ 0 \end{bmatrix} \quad \text{[Expression 3]}$$

where αtgt denotes the preceding-vehicle acceleration, and ωtgt denotes a differential value of the relative yaw angle δ. The preceding-vehicle acceleration may be calculated as the information on the preceding vehicle as described, and may be the differential value of the preceding-vehicle speed Vtgt.

Each of elements in [Expression 3] may be partially differentiated to generate a Jacobian matrix as follows.

$$A_{EKF}(k) = \begin{bmatrix} 1 & T\theta_{tgt}(k) & TV_{tgt}(k) & 0 & 0 \\ 0 & 1 & 0 & T & 0 \\ 0 & 0 & 1 & 0 & T \\ 0 & 0 & 0 & 1 & 0 \\ 0 & 0 & 0 & 0 & 1 \end{bmatrix} \quad \text{[Expression 4]}$$

where k denotes time, and T denotes a calculation cycle.

With use of the Jacobian matrix of [Expression 4], the lateral positional deviation speed Δx and the preceding-vehicle speed Vtgt may be obtained based on observation signals. Furthermore, the relative yaw angle θtgt may be estimated, or calculated, by application of the non-linear Kalman filter with an input of zero (0).

In the method (3) as described above, information involved in the calculation of the relative yaw angle δ may include the lateral positional deviation x and the information on the preceding vehicle, which may be obtained from results of image analysis by the image processor 12. This renders unnecessary the reception of information from the preceding vehicle by the inter-vehicular communication in the calculation of the relative yaw angle δ, leading to an advantage of the method (3).

3. Method of Restraining Follow-Up to Meandering According to Implementation A method of restraining a follow-up to meandering may involve adjusting magnitude of the correction gain $G_D$ in the forgoing [Expression 2], based on the relative yaw angle δ, to thereby calculate the target steering angle $\theta_{TG}$ that is provided for restriction of the follow-up to the preceding vehicle. In one specific but non-limiting implementation, the correction gain $G_D$ may be calculated by the following [Expression 5].

$$G_D = G_B \times Dp \quad \text{[Expression 5]}$$

where $G_B$ denotes a base gain, and Dp denotes a damping coefficient.

Adjustment of magnitude of the damping coefficient Dp, based on a mode of a change in the polarity of the relative yaw angle δ, results in adjustment of the magnitude of the correction gain $G_D$ in [Expression 2], based on the mode of the change in the polarity of the relative yaw angle δ.

Figure 7:
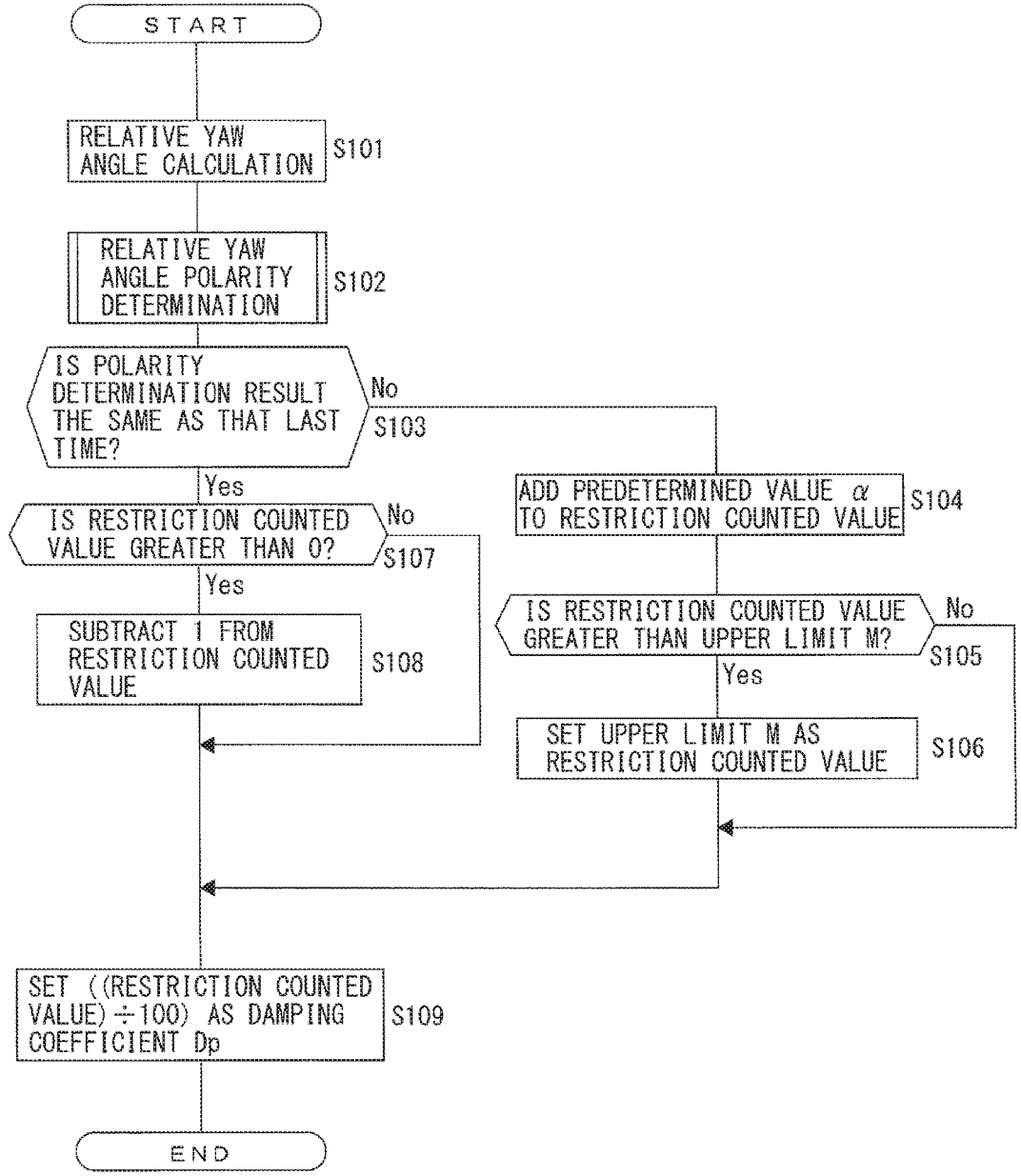
FIG. 7 is a flowchart that illustrates an example of a process of setting a damping coefficient, based on a mode of a change in the polarity of the relative yaw angle.

FIG. 7 is a flowchart of a process of setting the damping coefficient Dp, based on the mode of the change in the polarity of the relative yaw angle δ. Note that the process illustrated in FIG. 7 may be executed by the driving assistance controller 13, based on, for example but not limited to, a program stored in a predetermined storage device such as ROM. The process illustrated in FIG. 7 may be repeatedly executed, in response to, for example but not limited to, a start of the follow-up steering control, on cycles of obtaining the lateral positional deviation x from the image processor 12, in other words, on cycles of updates of the target steering angle $\theta_{TG}$.

Referring to FIG. 7, the driving assistance controller 13 may calculate the relative yaw angle δ in step S101. The relative yaw angle δ may be calculated by, for example but not limited to, any one of the forgoing methods (1) to (3).

Thereafter, in step S102, the driving assistance controller 13 may execute a relative-yaw-angle polarity determination process. The relative-yaw-angle polarity determination process may be a process of making a determination of the polarity of the relative yaw angle δ, which is described later in detail with reference to FIG. 9.

In response to the execution of the relative-yaw-angle polarity determination process in step S102, the driving assistance controller 13 may determine, in step S103, whether or not a result of the polarity determination in step S102 is same as a result last time.

When the result of the polarity determination is not the same as the result last time (No in step S103), that is, when a polarity inversion of the relative yaw angle δ has been detected, the flow may proceed to step S104. In step S104, the driving assistance controller 13 may add a predetermined value α to a restriction counted value, and the flow may proceed to step S105. Here, the restriction counted value may function as a value that decides a value of the damping coefficient Dp (refer to step S109), and may have an initial value of zero (0). When the restriction counted value is large, that is, the restriction counted value is an upper limit that equals to one (=1) in this implementation, the value of the damping coefficient Dp becomes large, causing an increase in the value of the correction gain $G_D$ calculated by [Expression 5] as well. Accordingly, in the calculation of the target steering angle $\theta_{TG}$ by [Expression 2], an amount of correction, i.e., an amount of restriction, of the target base steering angle $\theta_H$ becomes large, resulting in a decrease in an amount of control in the follow-up steering control.

In step S105, the driving assistance controller 13 may determine whether or not the restriction counted value is greater than an upper limit M. The upper limit M may be, for example but not limited to, "100" in this implementation. When the restriction counted value is greater than the upper limit M (Yes in step S105), the flow may proceed to step S106. In step S106, the driving assistance controller 13 may set the upper limit M as the restriction counted value, and the flow may proceed to step S109. When the restriction counted value is not greater than the upper limit M (No in step S105), the flow may skip step S106, and proceed to step S109.

In step S109, the driving assistance controller 13 may set, as the damping coefficient Dp, a value obtained by dividing the restriction counted value by 100 ((the restriction counted value)÷100). Thus, the process illustrated in FIG. 7 may be finished.

In step S103, when the result of the polarity determination in step S102 is same as the result last time (Yes in step S103), the flow may proceed to step S107. In step S107, the driving assistance controller 13 may determine whether or not the restriction counted value is greater than zero (0). When the restriction counted value is greater than zero (0) (Yes in step S107), the flow may proceed to step S108, in which the driving assistance controller 13 may reduce the restriction counted value by one (1). Thereafter, the flow may proceed to step S109. In step S107, when the restriction counted value is not greater than zero (0) (No in step S107), the flow may skip step S108, and proceed to step S109.

FIGS. 8A and 8B schematically illustrate an example of transition of the relative yaw angle δ (FIG. 8A) during the execution of the follow-up steering control, and transition of the damping coefficient Dp (FIG. 8B) calculated by the process described with reference to FIG. 7, in correspondence with the example of the transition of the relative yaw angle δ.

As appreciated with reference to FIGS. 8A and 8B, the predetermined value α may be added to the damping coefficient Dp in response to the polarity inversion of the relative yaw angle δ (refer to step S104). The damping coefficient Dp may be gradually lowered during a period of absence of the polarity inversion of the relative yaw angle δ (refer to step S108). The successive polarity inversions on relatively short cycles may lead to the frequent addition of the predetermined value α, causing the damping coefficient Dp to come to the upper limit M. When a length of each cycle of the successive polarity inversions is equal to or shorter than a certain length, the damping coefficient Dp may make transition in vicinity of the upper limit M. In other words, in a situation that the preceding vehicle meanders on relatively short cycles, that is, in a situation that the follow-up to the preceding vehicle may give the driver a greater sense of incongruity, the damping coefficient Dp may become relatively large. This causes the correction to be performed that decreases the target steering angle $\theta_{TG}$, allowing for the limitation of the amount of control in the follow-up steering control to a smaller value than usual. Hence, it is possible to restrain the follow-up to the meandering of the preceding vehicle.

In contrast, when the preceding vehicle does not meander, or when the preceding vehicle meanders on sufficiently long cycles, the damping coefficient Dp may be a relatively small value, causing the amount of correction of the target steering angle $\theta_{TG}$ to be small. Hence, it is possible to restrain follow-up performance from being lowered unnecessarily.

Figure 9:
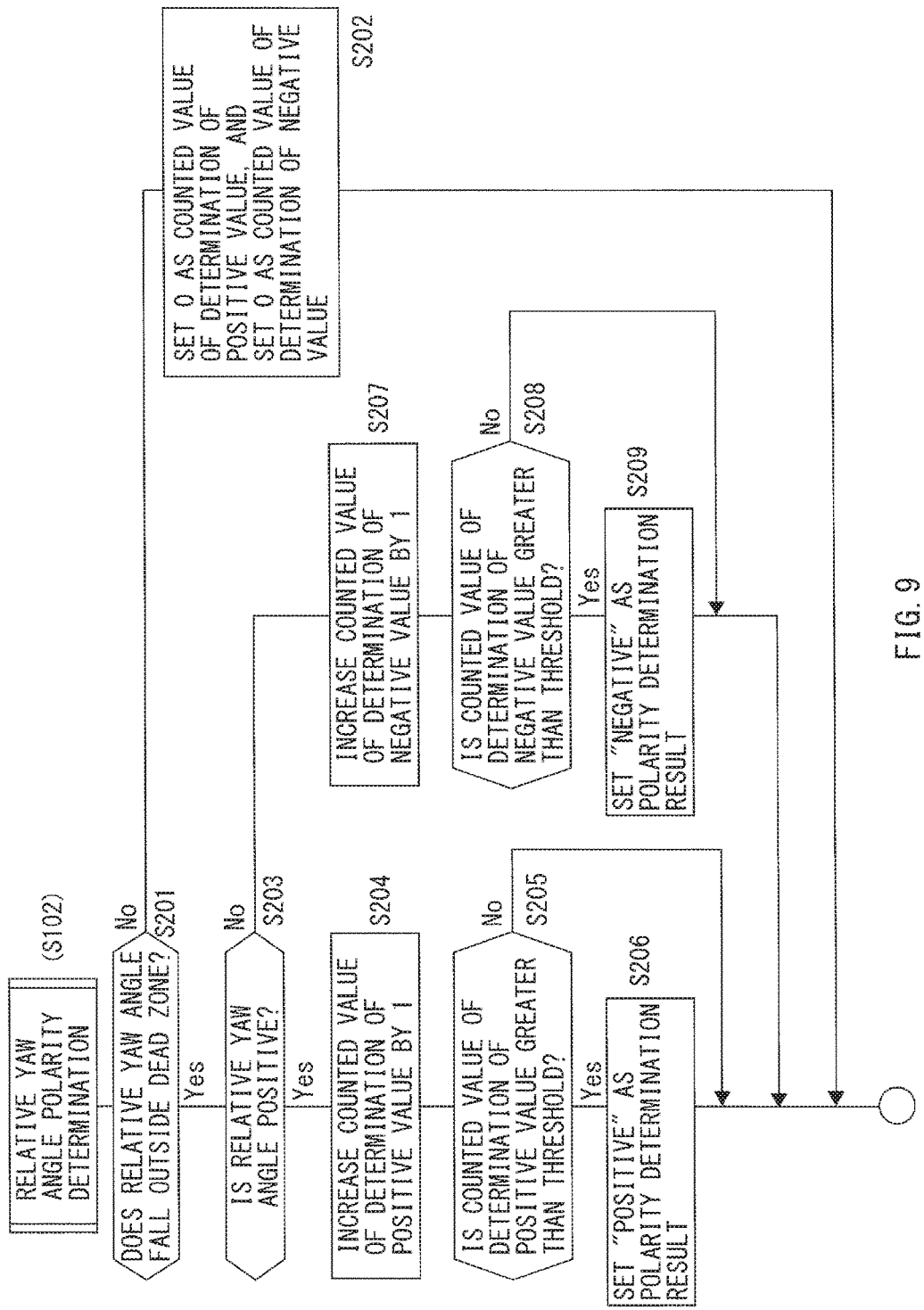
FIG. 9 is a flowchart of a polarity determination process of the relative yaw angle.

FIG. 9 is a flowchart of the relative-yaw-angle polarity determination process of step S102.

First, in step S201, the driving assistance controller 13 may determine whether or not the relative yaw angle δ falls outside a dead zone. This implementation may provide setting of the dead zone as exemplified in FIG. 8A, for the relative yaw angle δ. The dead zone may be set as a range with a reference at which the relative yaw angle δ equals to zero (=0). In this implementation, a center of the dead zone may coincide with the relative yaw angle δ being equal to zero (=0).

In step S201, when a determination has been made that the relative yaw angle δ does not fall outside the dead zone (No in step S201), the flow may proceed to step S202. In step S202, the driving assistance controller 13 may set zero (0) as each of a counted value of determination of a positive value and a counted value of determination of a negative value. Thus, the relative-yaw-angle polarity determination process of step S102 may be completed.

The counted value of the determination of the positive value may function as a value that indicates probability that the relative yaw angle δ is the positive value. The counted value of the determination of the negative value may function as a value that indicates probability that the relative yaw angle δ is the negative value. The polarity of the relative yaw angle δ may be determined in accordance of magnitude of the counted values (refer to steps S206 and S209).

When the relative yaw angle δ is obtained as a value inside the dead zone, the setting, i.e., an update, of the polarity determination result in steps S206 and S209 may not be provided. In other words, as long as the relative yaw angle δ has a value inside the dead zone, the determination result obtained so far may be maintained as the polarity determination result of the relative yaw angle δ.

In contrast, in step S201, when a determination has been made that the relative yaw angle δ falls outside the dead zone (Yes in step S201), the flow may proceed to step S203. In step S203, the driving assistance controller 13 may determine whether or not the relative yaw angle δ has the positive value. When the relative yaw angle δ has the positive value (Yes in step S203), the flow may proceed to steps S204 and S205. In step S204, the driving assistance controller 13 may increase the counted value of the determination of the positive value by one (1). Thereafter, in step S205, the driving assistance controller 13 may determine whether or not the counted value of the determination of the positive value is greater than a threshold. When the counted value of the determination of the positive value is greater than the threshold (Yes in step S205), the flow may proceed to step S206, in which the driving assistance controller 13 may set "positive" as the polarity determination result. Thus, the relative-yaw-angle polarity determination process of step S102 may be completed. Meanwhile, when the counted value of the determination of the positive value is not greater than the threshold (No in step S205), the flow may skip step S206, and the relative-yaw-angle polarity determination process of step S102 may be finished.

In step S203, when the relative yaw angle δ does not have the positive value (No in step S203), the flow may proceed to steps S207 and S208. In step S207, the driving assistance controller 13 may increase the counted value of the determination of the negative value by one (1). Thereafter, in step S208, the driving assistance controller 13 may determine whether or not the counted value of the determination of the negative value is greater than a threshold. When the counted value of the determination of the negative value is greater than the threshold (Yes in step S208), the flow may proceed to step S209, in which the driving assistance controller 13 may set "negative" as the polarity determination result. Thus, the relative-yaw-angle polarity determination process of step S102 may be completed. Meanwhile, when the counted value of the determination of the negative value is not greater than the threshold (No in step S208), the flow may skip step S209, and the relative-yaw-angle polarity determination process of step S102 may be finished.

FIG. 8A also illustrates the polarity determination result by the process illustrated in FIG. 9.

As seen in the process illustrated in FIG. 9, the polarity determination result may be updated as "positive" when the relative yaw angle δ has been obtained as values that are greater than an upper limit of the dead zone successively a predetermined number of times or more. The polarity determination result may be updated as "negative" when the relative yaw angle δ has been obtained as values that are smaller than a lower limit of the dead zone successively a predetermined number of times or more.

As described, the implementation may involve making the polarity determination of relative yaw angle δ with use of the dead zone. Hence, it is possible to prevent unnecessary detection of the polarity inversion due to an influence of a noise or other factors, leading to prevention of hunting of the control.

Note that, in the method of restraining the follow-up to meandering in the implementation as described above, a difference in the polarity of the relative yaw angle δ may mean a difference as to whether the traveling direction of the preceding vehicle is inclined leftward or rightward with respect to the traveling direction of the own vehicle. The polarity inversion of the relative yaw angle δ may be therefore alternatively expressed as an inversion of the inclination of the traveling direction of the preceding vehicle with respect to the traveling direction of the own vehicle between leftward inclination and rightward inclination. In other words, it is not essential to calculate the relative yaw angle δ as a value having the polarity of either one of positive and negative.

Note that there may be possible modification examples of the methods of restraining the follow-up to meandering. One possible modification example may be as follows.

First, the modification example may presuppose calculation of the target steering angle $\theta_{TG}$ by the following [Expression 6].

$$\theta_{TG} = G(v) \times G(\delta) \times x/z \quad \text{[Expression 6]}$$

where $G(\delta)$ denotes a correction gain in accordance with the relative yaw angle δ, and may be given by the following [Expression 7].

$$G(\delta) = 1 - Dp' \quad \text{[Expression 7]}$$

in which $Dp'$ denotes a damping coefficient.

This modification example may involve variably setting of the damping coefficient $Dp'$ as described, based on the polarity determination result of the relative yaw angle δ with use of the dead zone similar to the process illustrated in FIG. 9.

In one specific but non-limiting example, the damping coefficient $Dp'$ in this modification may be a value calculated repeatedly on predetermined calculation cycles, similarly to the case of the damping coefficient Dp, and may have an initial value that equals to zero (=0). In this case, based on the polarity determination result of the relative yaw angle δ obtained for each calculation cycle, a predetermined value β may be added to the damping coefficient $Dp'$ when the polarity determination result is different from the result last time. A predetermined value o may be subtracted from the damping coefficient $Dp'$ when the polarity determination result is the same as the result last time. At this occasion, the damping coefficient $Dp'$ may be calculated with an upper limit being equal to one (=1), and with a lower limit being equal to zero (=0).

Figure 10:
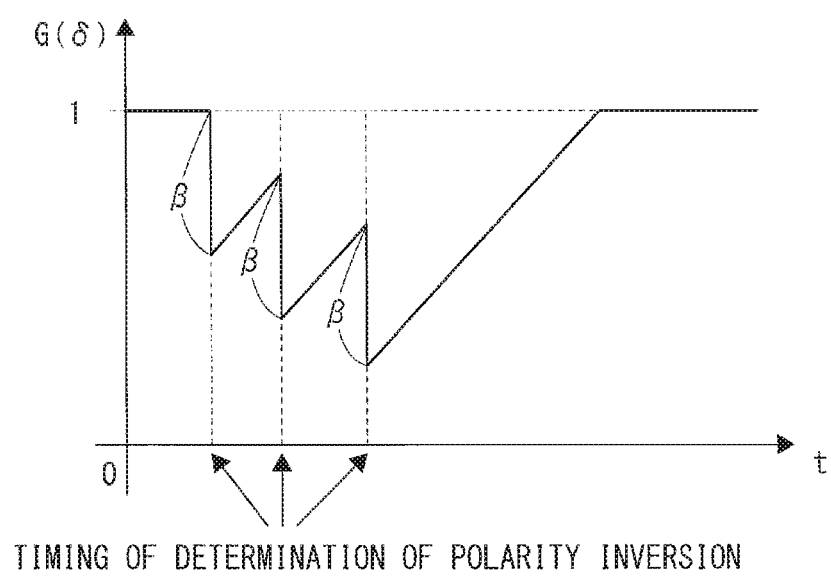
FIG. 10 illustrates a technique of restraining a follow-up to meandering, according to a modification example.

FIG. 10 illustrates one example of transition of the correction gain $G(\delta)$ in this modification example.

When the polarity inversions of the relative yaw angle δ have been determined on relatively short cycles, the predetermined value β may be successively added to the damping coefficient $Dp'$ at each timing of the determination. This causes the correction gain $G(\delta)$ to be gradually lowered. In other words, also in this case, in the situation that the preceding vehicle meanders on relatively short cycles, or in the situation that the follow-up to the meandering may give the driver a greater sense of incongruity, the correction may be performed that reduces the target steering angle $\theta_{TG}$, leading to limitation of the amount of control of the follow-up steering control to a smaller value than usual.

When the polarity of the relative yaw angle δ remain unchanged, the predetermined value o may be successively subtracted from the damping coefficient $Dp'$. This causes the correction gain $G(\delta)$ to be gradually raised. Accordingly, in a situation that the preceding vehicle does not meander, or in a situation that the preceding vehicle meanders on sufficiently long cycles, the limitation of the target steering angle $\theta_{TG}$ may be released. Hence, it is possible to restrain the follow-up performance from being unnecessarily lowered.

4. Summary of Illustrative Implementations

As described, the steering assistance control apparatus of illustrative implementations includes the image processor 12, the driving assistance controller 13, and the steering ECU 21. In one implementation, the image processor 12 may serve as a "positional deviation calculator that calculates a lateral positional deviation between an own vehicle and a preceding vehicle". In one implementation, the driving assistance controller 13 may serve as a "relative yaw angle calculator that calculates a relative yaw angle formed by a traveling direction of the own vehicle and a traveling direction of the preceding vehicle", and a "target value calculator that calculates a steering-related control target value, based on the lateral positional deviation and the relative yaw angle". In one implementation, the steering ECU 21 may serve as a "steering driver that drives a steering mechanism, based on the control target value".

With this configuration, it is possible to calculate the control target value, so as to restrain a follow-up to meandering of the preceding vehicle, based on a mode of occurrence of a difference in the traveling directions of the own vehicle and the preceding vehicle. The calculation of the relative yaw angle does not take as long time as the case of calculating cycles of changes of the lateral positional deviation. This allows for a relatively shortened time period from the start of the meandering of the preceding vehicle to the start of restraining the follow-up to the meandering. Hence, it is possible to restrain loss of immediate effectiveness of the control.

It is therefore possible to alleviate a driver's sense of incongruity due to meandering of the own vehicle attributed to the follow-up steering control, and to ensure the immediate effectiveness of the control.

In the steering assistance control apparatus of one implementation, a polarity inversion of the relative yaw angle may cause the target value calculator to calculate the control target value, to allow a control amount of steering to be smaller.

In the case of the polarity inversion of the relative yaw angle, a lateral position of the preceding vehicle may be expected to move finally to a current lateral position of the own vehicle in the future. Accordingly, the control amount of the steering may be allowed to be smaller, to restrain the follow-up to the preceding vehicle that is expected to be unnecessary.

Hence, it is possible to enhance an effect of alleviation of the driver's sense of incongruity due to the meandering of the own vehicle.

In the steering assistance control apparatus of one implementation, the target value calculator may calculate the control target value, to allow the control amount to be smaller in accordance with magnitude of an absolute value of the relative yaw angle (refer to [Expression 2]).

As the relative yaw angle becomes greater, the lateral positional deviation may change at a greater speed. Accordingly, the follow-up to the preceding vehicle may cause the steering angle of the own vehicle to change at a greater speed as well, resulting in the driver's even greater sense of incongruity. To allow the control amount to be smaller in accordance with the magnitude of the absolute value of the relative yaw angle, therefore, makes it possible to enhance an effect of alleviation of the driver's sense of incongruity.

In the steering assistance control apparatus of one implementation, the target value calculator may calculate the control target value, to allow the control amount to be smaller, as the polarity inversion of the relative yaw angle occurs on shorter cycles.

As the polarity inversion of the relative yaw angle occurs on shorter cycles, the follow-up to the preceding vehicle may give the driver a greater sense of incongruity. To allow the control amount to be smaller, therefore, makes it possible to restrain the follow-up to the meandering.

Hence, it is possible to effectively alleviate the driver's sense of incongruity.

In the steering assistance control apparatus of one implementation, the target value calculator may calculate the control target value, to alleviate a degree in which the control amount becomes smaller in accordance with a duration of time during which a polarity of the relative yaw angle is kept unchanged after the polarity inversion.

Hence, it is possible to restrain the follow-up to the preceding vehicle, and to restrain performance of the follow-up to the preceding vehicle from being lowered.

In other words, it is possible to alleviate the driver's sense of incongruity due to meandering of the own vehicle, and to restrain the performance of the follow-up steering control from being lowered.

In the steering assistance control apparatus of one implementation, the target value calculator uses a dead zone in polarity determination of the relative yaw angle.

Hence, it is possible to prevent hunting.

5. Modification Examples

The disclosure is not limited to the implementations described above, but may be modified and altered in various ways.

For example, in the forgoing implementations, the description is given on one implementation in which the lateral positional deviation between the own vehicle and the preceding vehicle may be obtained based on the stereo images captured by the image-capturing devices 11R and 11L. The lateral positional deviation may be, however, obtained by other methods. In one alternative, the lateral positional deviation may be obtained based on an image captured by a monocular camera and a detection result of the preceding vehicle by radar. In another alternative, the lateral positional deviation may be obtained based on a position detection result by a GPS sensor. Note that the expression "GPS" is not limited to the "Global Positioning System" that is on operation in the United States, but may refer to a "Global Navigation Satellite System (GNSS)" as a general "satellite positioning system".

One possible method of obtaining the lateral positional deviation, based on the position detection result by the GPS sensor, may involve: detecting a position of an own vehicle by a GPS sensor provided in the own vehicle; obtaining by inter-vehicular communication, as a position of a preceding vehicle, information on position detection by a GPS sensor provided in the preceding vehicle; and calculating the lateral positional deviation, based on the obtained information on the positions of the own vehicle and the preceding vehicle.

The invention claimed is:

1. A steering assistance control apparatus, comprising:
a positional deviation calculator that calculates a lateral positional deviation between an own vehicle and a preceding vehicle based on a detection signal from a sensor;
a relative yaw angle calculator that
calculates a first relative yaw angle formed by a first traveling direction of the own vehicle and a first traveling direction of the preceding vehicle at a first time period, and
calculates a second relative yaw angle formed by a second traveling direction of the own vehicle and a second traveling direction of the preceding vehicle at a second time period, wherein the second time period follows consecutively after the first time period;
a target value calculator that
determines a first polarity of the first relative yaw angle and a second polarity of the second relative yaw angle,
compares the first polarity of the first relative yaw angle to the second polarity of the second relative yaw angle, and
detects a polarity inversion between the first polarity of the first relative yaw angle and the second polarity of the second relative yaw angle based on determining that the first polarity of the first relative yaw angle differs from the second polarity of the second relative yaw angle based on the comparison,
calculates, in response to detecting a polarity inversion between the first polarity and the second polarity, a steering control target value based on the lateral positional deviation, the second relative yaw angle, and the detected polarity inversion; and
a steering driver that reduces a control amount of steering and drives a steering mechanism based on the steering control target value.

2. The steering assistance control apparatus according to claim 1,
wherein the target value calculator calculates the steering control target value in accordance with magnitude of an absolute value of the second relative yaw angle.

3. The steering assistance control apparatus according to claim 1,
wherein the target value calculator calculates the steering control target value based on the polarity inversions occurring on shorter cycles.

4. The steering assistance control apparatus according to claim 2,
wherein the target value calculator calculates the steering control target value based on the polarity inversions occurring on shorter cycles.

5. The steering assistance control apparatus according to claim 1,
wherein the target value calculator calculates the steering control target value in accordance with a duration of time during which the second polarity of the second relative yaw angle is kept unchanged after the polarity inversion is detected.

6. The steering assistance control apparatus according to claim 2,
wherein the target value calculator calculates the steering control target value in accordance with a duration of time during which the second polarity of the second relative yaw angle is kept unchanged after the polarity inversion is detected.

7. The steering assistance control apparatus according to claim 3,
wherein the target value calculator calculates the steering control target value in accordance with a duration of time during which the second polarity of the second relative yaw angle is kept unchanged after the polarity inversion is detected.

8. The steering assistance control apparatus according to claim 4,
wherein the target value calculator calculates the steering control target value in accordance with a duration of time during which the second polarity of the second relative yaw angle is kept unchanged after the polarity inversion is detected.

9. The steering assistance control apparatus according to claim 1,
wherein the target value calculator utilizes a dead zone when determining the first polarity of the first relative yaw angle and the second polarity of the second relative yaw angle.

10. The steering assistance control apparatus according to claim 2,
wherein the target value calculator utilizes a dead zone when determining the first polarity of the first relative yaw angle and the second polarity of the second relative yaw angle.

11. The steering assistance control apparatus according to claim 3,
wherein the target value calculator utilizes a dead zone when determining the first polarity of the first relative yaw angle and the second polarity of the second relative yaw angle.

12. The steering assistance control apparatus according to claim 4,
wherein the target value calculator utilizes a dead zone when determining the first polarity of the first relative yaw angle and the second polarity of the second relative yaw angle.

13. The steering assistance control apparatus according to claim 5,
wherein the target value calculator utilizes a dead zone when determining the first polarity of the first relative yaw angle and the second polarity of the second relative yaw angle.

14. The steering assistance control apparatus according to claim 6,
wherein the target value calculator utilizes a dead zone when determining the first polarity of the first relative yaw angle and the second polarity of the second relative yaw angle.

15. The steering assistance control apparatus according to claim 7,
wherein the target value calculator utilizes a dead zone when determining the first polarity of the first relative yaw angle and the second polarity of the second relative yaw angle.

16. The steering assistance control apparatus according to claim 8,
wherein the target value calculator utilizes a dead zone when determining the first polarity of the first relative yaw angle and the second polarity of the second relative yaw angle.

17. The steering assistance control apparatus according to claim 1,
wherein calculating the steering control target value further comprising:
calculating a first target steering angle based on the lateral positional deviation and the second relative yaw angle; and
calculating a second target steering angle based on the detected polarity inversion, the second target steering angle being smaller than the first target steering angle, and
wherein, when the target value calculator detects the polarity inversion between the first polarity of the first relative yaw angle and the second polarity of the second relative yaw angle while the steering driver drives a steering mechanism based on the first target steering angle, the steering driver changes driving the steering mechanism based on the first target steering angle to driving the steering mechanism based on the second target steering angle.

18. A steering assistance control apparatus, comprising:
a positional deviation calculator that calculates a lateral positional deviation between an own vehicle and a preceding vehicle based on a detection signal from a sensor;
a relative yaw angle calculator that
calculates a first relative yaw angle formed by a first traveling direction of the own vehicle and a first traveling direction of the preceding vehicle at a first time period,
calculates a second relative yaw angle formed by a second traveling direction of the own vehicle and a second traveling direction of the preceding vehicle at a second time period, wherein the second time period follows consecutively after the first time period, and
determines, utilizing a dead zone, a first polarity of the first relative yaw angle and a second polarity of the second relative yaw angle;
a target value calculator that, in response to detecting a polarity inversion between the first polarity and the second polarity, calculates a steering control target value based on 1) the lateral positional deviation, 2) the second relative yaw angle, 3) the polarity inversion occurring on shorter cycles, and 4) a duration of time during which the second polarity of the second relative yaw angle is kept unchanged after the polarity inversion is detected; and
a steering driver that reduces a control amount of steering and drives a steering mechanism based on the steering control target value.

* * * * *